(12) United States Patent
Mennecke et al.

(10) Patent No.: US 12,006,394 B2
(45) Date of Patent: Jun. 11, 2024

(54) CURABLE COMPOSITION OF LOW DENSITY

(71) Applicant: SIKA TECHNOLOGY AG, Baar (CH)

(72) Inventors: Klaas Mennecke, Lottstetten (DE); Daniele Rutz, Zürich (CH); Sara Stauber-Fedier, Dietlikon (CH); Berzad Durmic, Zufikon (CH)

(73) Assignee: SIKA TECHNOLOGY AG, Baar (CH)

( * ) Notice: Subject to any disclaimer, the term of this patent is extended or adjusted under 35 U.S.C. 154(b) by 629 days.

(21) Appl. No.: 17/274,617

(22) PCT Filed: Oct. 2, 2019

(86) PCT No.: PCT/EP2019/076740
§ 371 (c)(1),
(2) Date: Mar. 9, 2021

(87) PCT Pub. No.: WO2020/070207
PCT Pub. Date: Apr. 9, 2020

(65) Prior Publication Data
US 2022/0049045 A1 Feb. 17, 2022

(30) Foreign Application Priority Data

Oct. 3, 2018 (EP) .................................... 18198456

(51) Int. Cl.
| | | |
|---|---|---|
| *C08G 18/30* | (2006.01) | |
| *C08G 18/10* | (2006.01) | |
| *C08G 18/24* | (2006.01) | |
| *C08G 18/34* | (2006.01) | |
| *C08G 18/38* | (2006.01) | |
| *C08G 18/48* | (2006.01) | |
| *C08G 18/75* | (2006.01) | |
| *C08K 3/04* | (2006.01) | |
| *C08K 3/22* | (2006.01) | |
| *C08K 3/26* | (2006.01) | |
| *C08K 3/36* | (2006.01) | |
| *C08K 7/28* | (2006.01) | |

(52) U.S. Cl.
CPC .......... *C08G 18/307* (2013.01); *C08G 18/10* (2013.01); *C08G 18/242* (2013.01); *C08G 18/341* (2013.01); *C08G 18/3893* (2013.01); *C08G 18/4845* (2013.01); *C08G 18/755* (2013.01); *C08K 3/04* (2013.01); *C08K 3/22* (2013.01); *C08K 3/26* (2013.01); *C08K 3/36* (2013.01); *C08K 7/28* (2013.01); *C08G 2150/00* (2013.01); *C08G 2170/00* (2013.01); *C08G 2190/00* (2013.01); *C08K 2003/2241* (2013.01); *C08K 2003/265* (2013.01); *C08K 2201/003* (2013.01)

(58) Field of Classification Search
CPC .............. C08G 18/307; C08G 2190/00; C08G 18/4845; C08G 18/755; C08G 18/341; C08G 18/242; C08G 18/3898; C08G 18/10; C08G 2150/00; C08G 2170/00; C08K 3/36; C08K 3/26; C08K 3/22; C08K 7/28; C08K 2003/265; C08K 2003/2241; C08K 2201/003; C08K 3/04
USPC ........................................................ 524/591
See application file for complete search history.

(56) References Cited

U.S. PATENT DOCUMENTS

| | | |
|---|---|---|
| 4,469,831 A | 9/1984 | Bueltjer et al. |
| 4,853,454 A | 8/1989 | Merger et al. |
| 5,087,661 A | 2/1992 | Aoki et al. |
| 5,364,955 A | 11/1994 | Zwiener et al. |
| 8,261,577 B2 | 9/2012 | Qi |
| 2015/0166859 A1* | 6/2015 | Choffat ................. C08G 18/10 524/436 |
| 2015/0284610 A1* | 10/2015 | Zander ................ C08K 5/0016 524/425 |
| 2018/0320037 A1* | 11/2018 | Franken ............. C08G 18/4238 |

FOREIGN PATENT DOCUMENTS

| | | |
|---|---|---|
| DE | 10 2012 223 422 A1 | 6/2014 |
| EP | 1 772 447 A1 | 4/2007 |
| JP | 2000-017175 A | 1/2000 |
| WO | 2012/033810 A1 | 3/2012 |
| WO | 2017/121540 A1 | 7/2017 |
| WO | 2018/015552 A1 | 1/2018 |
| WO | 2018/033563 A1 | 2/2018 |

OTHER PUBLICATIONS

3M, Glass Bubbles, 2019. (Year: 2019).*
Wicks et al.; "Blocked isocyanates III: Part A. Mechanisms and chemistry;" Progress in Organic Coatings; 1999; pp. 148-172; vol. 36.
Reynolds et al.; "Measurements and characterization of particle size distributions in coastal waters;" Journal of Geophysical Research; 2010; pp. 1-19; vol. 115.
Wicks et al.; "Blocked isocyanates III Part B: Uses and applications of blocked isocyanates;" Progress in Organic Coatings; 2001; pp. 1-83; vol. 41.

(Continued)

*Primary Examiner* — Hui H Chin
(74) *Attorney, Agent, or Firm* — Oliff PLC

(57) ABSTRACT

A moisture-curing composition including a) at least one moisture-reactive polymer P with a proportion of 10% to 60% by weight, based on overall composition, b) at least one inorganic filler F with a proportion of at least 9% by weight, based on overall composition, c) between 3% and 25% by weight, based on overall composition, of at least one type of microscopic hollow beads H, wherein composition has density of less than 1.20 kg/l, and microscopic hollow beads H have compressive strength, measured to ASTM D3102-72, of at least 2.5 MPa, and microscopic hollow beads H have a volume-based particle size D90, measured by Coulter counter, of less than 100 μm.

17 Claims, No Drawings

(56) References Cited

OTHER PUBLICATIONS

Dec. 13, 2019 Search Report issued in International Patent Application No. PCT/EP2019/076740.
Mar. 23, 2021 International Preliminary Report on Patentability issued in International Patent Application No. PCT/EP2019/076740.

* cited by examiner

CURABLE COMPOSITION OF LOW DENSITY

TECHNICAL FIELD

The invention relates to moisture-curing compositions of low density and to the use thereof as adhesives and sealants and also coatings.

STATE OF THE ART

Moisture-curing compositions play a significant role in many industrial applications, for example as one- or two-component adhesives, sealants or coatings. The curing thereof is brought about by crosslinking reactions that proceed under the influence of water via free or latent reactive groups, for example isocyanate groups or silane groups, wherein these react with themselves or one another by contact with moisture, primarily from air or in the form of water in a second mixture component, thereby covalently linking the structural components present in the composition to form a polymeric network.

Depending on the field of application, a very wide range of products having versatile individual properties can be formulated in the field of moisture-curing compositions. An important role here is played in particular by admixtures such as fillers, plasticizers, additives and adhesion promoters, which have a substantial effect on the properties of the formulation, for example adhesion, mechanics, and processability. Most of these moisture-curing compositions have a relatively high density, mostly in the region of 1.20 kg/L and over. The density is founded not just on the key constituents such as moisture-reactive polymers, plasticizers, and adhesion promoter additives, which higher densities above 1.00 kg/L, but also on fillers in particular. Fillers in such moisture-curing compositions are generally indispensable. Not only do they help bring down the formulation costs significantly, they also make a major contribution to the mechanical properties and to the processing properties of the compositions. Unfortunately, common fillers such as chalk typically have a density in the region of over 2.00 kg/L, which increases the overall density of the composition significantly. However, advances in lightweight construction and the need to reduce transport costs mean that the demand for adhesives and sealants that have low density is becoming ever more acute in construction and industry. Densities of 1.00 kg/L or even lower are in particular desired. To meet this need, hollow microspheres have for some time been used as admixtures in moisture-reactive compositions. These hollow spheres are essentially spherical, gas-filled particles having a diameter of not more than 500 μm and having shells made for example of glass, silicates or plastics. These hollow microspheres have a density of sometimes well below 1.00 kg/L and, when admixed in moisture-curing compositions, can substantially reduce the resulting overall density thereof. In addition to low density, advantageous properties such as heat insulation or sound insulation can also be achieved thereby, which is desirable for example in motor vehicle construction or in floor adhesives.

However, the use of such hollow microspheres for density reduction also has significant drawbacks. Mechanical properties such as elongation at break and, in particular, tensile strength are appreciably downgraded by the use of such hollow microspheres. This is a particular problem in the case of structural adhesives, where excellent mechanical properties are absolutely essential. To counter this, the admixing of large amounts of reinforcing carbon black as filler has begun to be employed. Although it is thereby possible to achieve acceptable mechanical properties and reduced density, the composition becomes extremely viscous and can be applied only with high-performance pumps and with the application of heat. Moreover, it is possible to produce in this manner only deep black compositions, which cannot be colored and from an esthetic viewpoint therefore have only a very limited range of applications.

Also widespread is the use of hollow microspheres having polymeric shells, for example those marketed under the trade name Expancel. Although these show very good compatibility with the other constituents of the composition and result in preservation of the mechanical properties of the weight-reduced compositions up to a certain degree, these hollow spheres are reversibly deformable, i.e. compressible, under pressure. This means that after expressing the composition from, for example, a cartridge, the composition continues to run out of the applicator, which is unwelcome and extremely uncomfortable for the user. Low-density moisture-curing compositions that comprise hollow microspheres generally have poor pumpability and in many cases the density is irreversibly increased after pumping operations. Moreover, most of these compositions have a reduced density that is not stable over time and increases irreversibly on prolonged storage. The reasons for this include, for example, the destruction of significant proportions of the hollow spheres or the migration of substances into the hollow cavities thereof.

The need therefore still remains for a moisture-curing composition having a density of less than 1.20 kg/L, preferably less than 1.10 kg/L, in particular less than 1.00 kg/L, that does not have the abovementioned disadvantages of the prior art and that has improved mechanical properties, in particular tensile strength, good pumpability at low extrusion forces, and a stable reduced density even after pumping and prolonged storage.

SUMMARY OF THE INVENTION

It is therefore an object of the present invention to provide a moisture-curing composition having a density of less than 1.20 kg/L, preferably less than 1.10 kg/L, in particular less than 1.00 kg/L, that has improved tensile strength with good elongation at break, can be easily applied and pumped at room temperature, does not show a significant, irreversible increase in density after pumping or on prolonged storage, and does not continue to run out of the applicator after use. This object is surprisingly achieved by a moisture-curing composition as described in claim 1. Through the use of an inorganic filler in combination with hollow microspheres of a particular size and compressive strength and defined amount of all constituents of the composition, it is possible to produce a moisture-curing composition of low density that achieves the object of the present invention.

In preferred embodiments it is thus possible to produce not only construction adhesives, for example for floors, but also relatively easily applied structural adhesives or sealants having sound and heat insulation properties or fire-reducing properties.

Further aspects of the invention are the subject of further independent claims. Particularly preferred embodiments of the invention are the subject of the dependent claims.

Ways of Executing the Invention

The invention provides a moisture-curing composition, comprising a) at least one moisture-reactive polymer P in a proportion of 10% to 60% by weight, based on the total composition,
b) at least one inorganic filler F in a proportion of at least 9% by weight, based on the total composition,
c) between 3% and 25% by weight, based on the total composition, of at least one type of hollow microsphere H, characterized in that the composition has a density of less than 1.20 kg/L, preferably less than 1.10 kg/L, and the hollow microspheres H have a compressive strength, measured in accordance with ASTM D3102-72, of at least 2.5 MPa, preferably at least MPa, and the hollow microspheres H have a volume-based particle size D90, measured with a Coulter counter, of less than 100 μm.

The term "silane group" refers to a silyl group attached to an organic radical and having one to three, especially two or three, hydrolyzable substituents on the silicon atom. Particularly common hydrolyzable substituents are alkoxy radicals. These silane groups are also referred to as "alkoxysilane groups". Silane groups may also be in partly or fully hydrolyzed form.

"Hydroxysilane", "isocyanatosilane", "aminosilane" and "mercaptosilane" refer respectively to organoalkoxysilanes having one or more hydroxyl, isocyanato, amino or mercapto groups on the organic radical in addition to the silane group. Substance names beginning with "poly", such as polyol or polyisocyanate, refer to substances that formally contain two or more of the functional groups that occur in their name per molecule.

The term "organic polymer" encompasses a collective of macromolecules that is chemically homogeneous but differs in its degree of polymerization, molar mass, and chain length, which has been produced by a poly reaction (polymerization, polyaddition, polycondensation), and has a majority of carbon atoms in the polymer backbone, and also reaction products of such a collective of macromolecules.

The term "polyurethane polymer" encompasses all polymers produced according to the so-called diisocyanate polyaddition process. This also includes polymers that are virtually or completely free of urethane groups. Examples of polyurethane polymers are polyether polyurethanes, polyester polyurethanes, polyether polyureas, polyureas, polyester polyureas, polyisocyanurates, and polycarbodiimides.

Polymers containing silane groups here means not just silicone polymers (polydiorganosiloxane polymers), but also, in particular, organic polymers containing silane groups, which are typically and in this document in particular also referred to synonymously as "silane-functional polymers", "silane-modified polymers" (SMP) or "silane-terminated polymers" (STP). The crosslinking thereof proceeds via the condensation of silanol groups to form siloxane bonds and is conventionally catalyzed by means of organotin compounds such as dialkyltin(IV) carboxylates in particular.

The term "polyether containing silane groups" also encompasses organic polymers containing silane groups that, in addition to polyether units, may also contain urethane groups, urea groups or thiourethane groups. Such polyethers containing silane groups may also be referred to as "polyurethanes containing silane groups". "Molecular weight" is understood in the present document as meaning the molar mass (in grams per mole) of a molecule or part of a molecule, also referred to as a "radical". "Average molecular weight" refers to the number average $M_n$ of an oligomeric or polymeric mixture of molecules or radicals, which is typically determined by means of gel-permeation chromatography (GPC) against polystyrene as standard.

A substance or composition is referred to as "storage-stable" or "storable" if it can be stored at room temperature in a suitable container for a prolonged period, typically of at least 3 months up to 6 months or longer, without storage resulting in any change in its application properties or use properties, particularly in the viscosity and crosslinking rate, to an extent relevant for the use thereof.

A dashed line in the formulae in this document in each case represents the bond between a substituent and the associated molecular radical.

"Room temperature" refers to a temperature of approx. 23° C.

All industry standards and norms mentioned in the document refer to the version valid at the date of first filing.

The terms "mass" and "weight" are used synonymously in this document. Thus a "percentage by weight" (% by weight) is a percentage mass fraction that, unless otherwise stated, refers to the mass (weight) of the total composition or, depending on the context, of the entire molecule.

A moisture-curing composition is for the purposes of the present invention in particular a polyurethane composition, in particular a two-component system that undergoes crosslinking by reaction of polyols with isocyanates, as employed, for example, for adhesives, coverings, potting compounds, sealing joints, moldings or slabstock foams, or a one-component system having blocked (latent) isocyanate groups or blocked (latent) amino groups, as used, for example, in powder coatings, coil coatings, electrocoat materials or liquid paints; or a composition based on silane-functional polymers (polymers containing silane groups). Compositions based on silane-functional polymers cure rapidly even at relatively low catalyst concentrations and show good adhesion behavior on many substrates even without the use of primers. They are also toxicologically advantageous on account of the absence of isocyanates.

Thus suitable as the moisture-reactive polymer P for the purposes of the present invention are preferably polyurethane polymers PU having free or latent isocyanates and silane-functional polymers STP.

The composition according to the invention contains the at least one moisture-reactive polymer P in a proportion of 10% to 60% by weight, preferably 15% to 50% by weight, based on the total composition.

In one embodiment, the moisture-reactive polymer P comprises at least one polyurethane polymer PU having free or latent isocyanate groups. Suitable isocyanate-containing polyurethane polymers PU for producing a composition according to the invention are for example polymers obtainable by the reaction of at least one polyol with at least one polyisocyanate, in particular a diisocyanate. This reaction may be carried out by reacting the polyol and the polyisocyanate by means of customary methods, for example at temperatures of 50° C. to 100° C., optionally with co-use of suitable catalysts, with the polyisocyanate being dosed such that the isocyanate groups contained therein are present in a stoichiometric excess in relation to the hydroxyl groups of the polyol.

In particular, the chosen excess of polyisocyanate is such that, after reaction of all the hydroxyl groups in the polyol, the resulting polyurethane polymer has a residual content of free isocyanate groups of 0.1% to 5% by weight, preferably 0.2% to 3% by weight, more preferably 0.3% to 2.5% by weight, based on the total polymer.

The polyurethane polymer PU may optionally be produced with co-use of plasticizers, wherein the employed plasticizers contain no isocyanate-reactive groups.

Preference is given to polyurethane polymers having the recited content of free isocyanate groups that are obtained from the reaction of diisocyanates with high-molecular-weight diols in an NCO:OH ratio of 1.3:1 to 4:1, in particular 1.5:1 to 3:1 and particularly preferably 1.7:1 to 2.5:1.

Suitable polyols for the production of the isocyanate-containing polyurethane polymer are in particular polyether polyols, styrene-acrylonitrile-grafted polyether polyols, polyester polyols, polycarbonate polyols, poly(meth)acrylate polyols, polyhydroxy-functional fats and oils or polyhydrocarbon polyols, and also mixtures of said polyols.

Suitable polyether polyols, also known as polyoxyalkylene polyols or oligoetherols, are in particular those that are polymerization products of ethylene oxide, 1,2-propylene oxide, 1,2- or 2,3-butylene oxide, oxetane, tetrahydrofuran or mixtures thereof, optionally polymerized with the aid of a starter molecule having two or more active hydrogen atoms such as water, ammonia or compounds having a plurality of OH or NH groups, for example ethane-1,2-diol, propane-1,2-diol and -1,3-diol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, cyclohexane-1,3-dimethanol and -1,4-dimethanol, bisphenol A, hydrogenated bisphenol A, 1,1,1-trimethylolethane, 1,1,1-trimethylolpropane, glycerol, aniline, and also mixtures of the recited compounds. Employable are both polyoxyalkylene polyols having a low degree of unsaturation (measured in accordance with ASTM D-2849-69 and expressed in milliequivalents of unsaturation per gram of polyol (meq/g)), produced for example using so-called double metal cyanide complex catalysts (DMC catalysts), and polyoxyalkylene polyols having a relatively high degree of unsaturation, produced for example using anionic catalysts such as NaOH, KOH, CsOH or alkali metal alkoxides. Particularly suitable are polyoxyethylene polyols and polyoxypropylene polyols, in particular polyoxyethylene diols, polyoxypropylene diols, polyoxyethylene triols, and polyoxypropylene triols.

Especially suitable are polyoxyalkylene diols or polyoxyalkylene triols having a degree of unsaturation lower than 0.02 meq/g and having a molecular weight within a range from 1000 to 30 000 g/mol, as are polyoxyethylene diols, polyoxyethylene triols, polyoxypropylene diols, and polyoxypropylene triols having a molecular weight of 400 to 20 000 g/mol.

Likewise particularly suitable are so-called ethylene oxide-terminated ("EO-endcapped", ethylene oxide-endcapped) polyoxypropylene polyols. The latter are special polyoxypropylene polyoxyethylene polyols that are obtained for example when pure polyoxypropylene polyols, in particular polyoxypropylene diols and triols, are at the end of the polypropoxylation reaction further alkoxylated with ethylene oxide and thus have primary hydroxyl groups. Preference in this case is given to polyoxypropylene polyoxyethylene diols and polyoxypropylene polyoxyethylene triols.

Suitable polyester polyols include in particular polyesters that bear at least two hydroxyl groups and are produced by known processes, in particular polycondensation of hydroxycarboxylic acids or polycondensation of aliphatic and/or aromatic polycarboxylic acids with dihydric or polyhydric alcohols. Especially suitable are polyester polyols produced from dihydric to trihydric alcohols such as ethane-1,2-diol, diethylene glycol, propane-1,2-diol, dipropylene glycol, butane-1,4-diol, pentane-1,5-diol, hexane-1,6-diol, neopentyl glycol, glycerol, 1,1,1-trimethylolpropane or mixtures of the abovementioned alcohols with organic dicarboxylic acids or the anhydrides or esters thereof, for example succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid and trimellitic anhydride or mixtures of the abovementioned acids, as are polyester polyols formed from lactones such as ε-caprolactone.

Particularly suitable are polyester diols, in particular those produced from adipic acid, azelaic acid, sebacic acid, dodecanedicarboxylic acid, dimer fatty acid, phthalic acid, isophthalic acid and terephthalic acid as the dicarboxylic acid or from lactones such as ε-caprolactone and from ethylene glycol, diethylene glycol, neopentyl glycol, butane-1,4-diol, hexane-1,6-diol, dimer fatty acid diol, and cyclohexane-1, 4-dimethanol as the dihydric alcohol.

Suitable polycarbonate polyols include in particular those obtainable by reaction for example of the abovementioned alcohols used to form the polyester polyols with dialkyl carbonates such as dimethyl carbonate, diaryl carbonates such as diphenyl carbonate, or phosgene. Polycarbonate diols, in particular amorphous polycarbonate diols, are particularly suitable.

Further suitable polyols are poly(meth)acrylate polyols.

Also suitable are polyhydroxy-functional fats and oils, for example natural fats and oils, in particular castor oil, or so-called oleochemical polyols obtained by chemical modification of natural fats and oils, the epoxy polyesters or epoxy polyethers obtained for example by epoxidation of unsaturated oils and subsequent ring opening with carboxylic acids or alcohols respectively, or polyols obtained by hydroformylation and hydrogenation of unsaturated oils. Also suitable are polyols obtained from natural fats and oils by degradation processes such as alcoholysis or ozonolysis and subsequent chemical linking, for example by transesterification or dimerization, of the thus obtained degradation products or derivatives thereof. Suitable degradation products of natural fats and oils are in particular fatty acids and fatty alcohols and also fatty acid esters, in particular the methyl esters (FAME), which can be derivatized to hydroxy fatty acid esters, for example by hydroformylation and hydrogenation.

Likewise suitable are also polyhydrocarbon polyols, also known as oligohydrocarbonols, for example polyhydroxy-functional ethylene-propylene-, ethylene-butylene- or ethylene-propylene-diene copolymers, such as those produced for example by Kraton Polymers, USA, or polyhydroxy-functional copolymers of dienes such as 1,3-butadiene or diene mixtures and vinyl monomers such as styrene, acrylonitrile or isobutylene, or polyhydroxy-functional polybutadiene polyols, for example those that that are produced by oxidation of polybutadiene or copolymerization of 1,3-butadiene and allyl alcohol and may also have been hydrogenated.

Also suitable are polyhydroxy-functional acrylonitrile/butadiene copolymers, such as those that can be produced for example from epoxides or amino alcohols and carboxyl-terminated acrylonitrile/butadiene copolymers that are commercially available under the name Hypro® CTBN from Emerald Performance Materials, LLC, USA.

These recited polyols preferably have an average molecular weight of 250 to 30,000 g/mol, in particular from 1000 to 20 000 g/mol, and an average OH functionality within a range from 1.6 to 3.

Particularly suitable polyols are polyether polyols, in particular polyoxyethylene polyol, polyoxypropylene polyol, and polyoxypropylene polyoxyethylene polyol, preferably polyoxyethylene diol, polyoxypropylene diol, polyoxyethylene triol, polyoxypropylene triol, polyoxypropylene polyoxyethylene diol, and polyoxypropylene polyoxyethylene triol.

In the production of the terminal isocyanate-containing polyurethane polymer, it is also possible to use alongside these recited polyols small amounts of low-molecular-weight dihydric or polyhydric alcohols such as ethane-1,2-diol, propane-1,2-diol and -1,3-diol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, cyclohexane-1,3-dimethanol and -1,4-dimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher polyhydric alcohols, low-molecular-weight alkoxylation products of the abovementioned dihydric and polyhydric alcohols and mixtures of the abovementioned alcohols.

Polyisocyanates that may be used for the production of the polyurethane polymer include commercially available polyisocyanates, in particular diisocyanates. Examples of suitable diisocyanates include hexamethylene 1,6-diisocyanate (HDI), 2-methylpentamethylene 1,5-diisocyanate, 2,2,4- and 2,4,4-trimethylhexamethylene 1,6-diisocyanate (TMDI), dodecamethylene 1,12-diisocyanate, lysine and lysine ester diisocyanate, cyclohexane 1,3-diisocyanate, cyclohexane 1,4-diisocyanate, 1-isocyanato-3,3,5-trimethyl-5-isocyanatomethylcyclohexane (=isophorone diisocyanate or IPDI), perhydro-2,4'-diphenylmethane diisocyanate and perhydro-4,4'-diphenylmethane diisocyanate, 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1,3-xylylene diisocyanate, m- and p-tetramethyl-1,4-xylylene diisocyanate, bis(1-isocyanato-1-methylethyl)naphthalene, tolylene 2,4-diisocyanate and 2,6-diisocyanate (TDI), diphenylmethane 4,4'-diisocyanate, 2,4'-diisocyanate, and 2,2'-diisocyanate (MDI), phenylene 1,3-diisocyanate and 1,4-diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TODI), oligomers and polymers of the abovementioned isocyanates, and also any desired mixtures of the abovementioned isocyanates, with particular preference given to MDI and TDI.

In the composition according to the invention the isocyanate-containing polyurethane polymer PU is preferably present in an amount of 10% by weight to 60% by weight, in particular in an amount of 15% by weight to 50% by weight, based on the total composition.

In one-component compositions comprising the isocyanate-containing polyurethane polymer PU, it may be advantageous to block, and thus make latent, the isocyanate groups in order to increase storage stability through the prevention of premature reaction in the container.

The blocking of the isocyanate groups to produce blocked or latent isocyanate groups through appropriate blocking agents that can undergo thermoreversible reaction with isocyanate groups is a common measure in the field and a person skilled in the art can readily perform said blocking. A person skilled in the art is familiar with a large number of suitable blocking agents/blocking groups, for example those in the review articles by Douglas A. Wick in Progress in Organic Coatings 36 (1999), 148-172 and in Progress in Organic Coatings 41 (2001), 1-83, to which reference is hereby made.

Another, in some cases yet more advantageous, method for stabilizing one-component polyurethane compositions is the use of latent curing agents. These are blocked (latent) polyamines that, under the influence of e.g. water, lose their blocking group and react to form free amines that then react with the isocyanates in a rapid reaction that results in crosslinking.

Such blocked amines as latent curing agents are likewise very well known to a person skilled in the art and he/she will find in the prior art many options for producing and using latent amines. Examples are described in U.S. Pat. Nos. 4,469,831, 4,853,454, and 5,087,661 and also in EP 1772447, to which reference is hereby made.

In a further embodiment, the moisture-reactive polymer P comprises at least one silane-functional polymer STP.

In one embodiment thereof, the silane-functional polymer is a polydiorganosiloxane polymer. The composition is thus a silicone composition that comprises silane-functional polymers having reactive silane end groups, for example alkoxy-, acetoxy- or oxime silane end groups and/or silane-functional polymers having silanol end groups, wherein, particularly in the latter case, it is necessary for silicone crosslinkers to also be present in the composition. Silicone systems of this kind have long been known to a person skilled in the art. For example, such silicone systems, in particular the associated silane-functional polymers and crosslinkers such as those suitable for the present invention, are described in WO 2018/033563 A1.

The silane-functional polymer STP is preferably an organic polymer containing silane groups, in particular a polyurethane, polyolefin, polyester, polyamide, poly(meth)acrylate or polyether or a mixed form of said polymers, each of which bears one or preferably more than one silane group. The silane groups may be in pendant positions in the chain or in terminal positions and are attached to the organic polymer via a carbon atom.

The organic polymer containing silane groups is particularly preferably a polyurethane containing silane groups or a a polyolefin containing silane groups or a polyester containing silane groups or a poly(meth)acrylate containing silane groups or a polyether containing silane groups or a mixed form of said polymers. The organic polymer containing silane groups is most preferably a polyether containing silane groups or a polyurethane containing silane groups, which is preferably formed from polyether polyols.

In the organic polymer containing silane groups, the silane groups are preferably alkoxysilane groups, in particular alkoxysilane groups of the formula (I)

where $R^{14}$ is a linear or branched monovalent hydrocarbyl radical having 1 to 5 carbon atoms, especially methyl or ethyl or isopropyl;

$R^{15}$ is a linear or branched monovalent hydrocarbyl radical having 1 to 8 carbon atoms, especially methyl or ethyl; and x has a value of 0 or 1 or 2, preferably 0 or 1, especially 0.

$R^{14}$ is particularly preferably methyl or ethyl.

Particular preference is given to trimethoxysilane groups, dimethoxymethylsilane groups or triethoxysilane groups.

Methoxysilane groups have the advantage of being particularly reactive and ethoxysilane groups have the advantage of being toxicologically advantageous and particularly storage-stable.

The organic polymer containing silane groups has on average preferably 1.3 to 4, especially 1.5 to 3, particularly preferably 1.7 to 2.8, silane groups per molecule. The silane groups are preferably terminal.

The organic polymer containing silane groups STP preferably has an average molecular weight within a range from 1000 to 30 000 g/mol, especially from 2000 to 20 000 g/mol. The organic polymer containing silane groups preferably has a silane equivalent weight of 300 to 25 000 g/eq, in particular of 500 to 15 000 g/eq.

The organic polymer containing silane groups STP may be solid or liquid at room temperature. It is preferably liquid at room temperature.

The organic polymer containing silane groups STP is most preferably a polyether containing silane groups that is liquid at room temperature, wherein the silane groups are especially dialkoxysilane groups and/or trialkoxysilane groups, particularly preferably trimethoxysilane groups or triethoxysilane groups.

Processes for producing polyethers containing silane groups are known to a person skilled in the art.

In a preferred process, polyethers containing silane groups are obtainable from the reaction with hydrosilanes of polyethers containing allyl groups, optionally with chain extension using for example diisocyanates.

In a further preferred process, polyethers containing silane groups are obtainable from the copolymerization of alkylene oxides and epoxysilanes, optionally with chain extension using for example diisocyanates.

In a further preferred process, polyethers containing silane groups are obtainable from the reaction of polyether polyols with isocyanatosilanes, optionally with chain extension using diisocyanates.

In a further preferred process, polyethers containing silane groups are obtainable from the reaction of isocyanate-containing polyethers—in particular NCO-terminated urethane polyethers from the reaction of polyether polyols with a suprastoichiometric amount of polyisocyanates—with aminosilanes, hydroxysilanes or mercaptosilanes. Particular preference is given to polyethers containing silane groups from this process. This process allows the use of a large number of commercially readily available inexpensive starting materials by means of which varying polymer properties can be obtained, for example high extensibility, high strength, low modulus of elasticity, low glass transition temperature or high resistance to weathering.

The polyurethane containing silane groups is particularly preferably obtainable from the reaction of NCO-terminated urethane polyethers with aminosilanes or hydroxysilanes. Suitable NCO-terminated urethane polyethers are obtainable from the reaction of polyether polyols, in particular polyoxyalkylene diols or polyoxyalkylene triols, preferably polyoxypropylene diols or polyoxypropylene triols, with a suprastoichiometric amount of polyisocyanates, in particular diisocyanates.

The reaction between the polyisocyanate and the polyether polyol is preferably carried out with exclusion of moisture at a temperature of 50° C. to 160° C., optionally in the presence of suitable catalysts, with the polyisocyanate being dosed such that the isocyanate groups contained therein are present in a stoichiometric excess in relation to the hydroxyl groups of the polyol. In particular, the chosen excess of polyisocyanate is such that, after reaction of all the hydroxyl groups, the resulting urethane polyether has a residual content of free isocyanate groups of 0.1% to 5% by weight, preferably 0.2% to 4% by weight, more preferably 0.3% to 3% by weight, based on the total polymer.

Preferred diisocyanates are selected from the group consisting of hexamethylene 1,6-diisocyanate (HDI), 1-isocyanato-3,3,5-trimethyl-5-isocyanatomethylcyclohexane (isophorone diisocyanate or IPDI), tolylene 2,4-diisocyanate and 2,6-diisocyanate and any desired mixtures of these isomers (TDI), and diphenylmethane 4,4'-diisocyanate, 2,4'-diisocyanate, and 2,2'-diisocyanate and any desired mixtures of these isomers (MDI). Particular preference is given to IPDI or TDI. Most preferred is IPDI. This allows polyurethanes that contain silane groups and have particularly good lightfastness to be obtained.

Especially suitable as polyether polyols are polyoxyalkylene diols or polyoxyalkylene triols having a degree of unsaturation below 0.02 meq/g, in particular below 0.01 meq/g, and an average molecular weight within a range from 400 to 25 000 g/mol, in particular 1000 to 20 000 g/mol.

In addition to polyether polyols it is also possible to use proportions of other polyols, in particular polyacrylate polyols, and also low-molecular-weight diols or triols.

Suitable aminosilanes for the reaction with an NCO-terminated urethane polyether are primary and secondary aminosilanes. Preference is given to 3-aminopropyltrimethoxysilane, 3-aminopropyldimethoxymethylsilane, 4-aminobutyltrimethoxysilane, 4-amino-3-methylbutyltrimethoxysilane, 4-amino-3,3-dimethylbutyltrimethoxysilane, N-butyl-3-aminopropyltrimethoxysilane, N-phenyl-3-aminopropyltrimethoxysilane, adducts formed from primary aminosilanes such as 3-aminopropyltrimethoxysilane, 3-aminopropyldimethoxy-methylsilane or N-(2-aminoethyl)-3-aminopropyltrimethoxysilane and Michael acceptors such as acrylonitrile, (meth)acrylic esters, (meth)acrylamides, maleic or fumaric diesters, citraconic diesters or itaconic diesters, in particular dimethyl or diethyl N-(3-trimethoxysilylpropyl)aminosuccinate. Likewise suitable are analogs of the recited aminosilanes having ethoxy or isopropoxy groups in place of the methoxy groups on the silicon.

Suitable hydroxysilanes for the reaction with an NCO-terminated urethane polyether are in particular obtainable from the addition of aminosilanes to lactones or to cyclic carbonates or to lactides.

Aminosilanes suitable for this purpose are in particular 3-aminopropyltrimethoxysilane, 3-aminopropyltriethoxysilane, 4-aminobutyltrimethoxysilane, 4-aminobutyltriethoxysilane, 4-amino-3-methylbutyltrimethoxysilane, 4-amino-3-methylbutyltriethoxysilane, 4-amino-3,3-dimethylbutyltrimethoxysilane, 4-amino-3,3-dimethylbutyltriethoxysilane, 2-aminoethyltrimethoxysilane or 2-aminoethyltriethoxysilane. Particular preference is given to 3-aminopropyltrimethoxysilane, 3-aminopropyltriethoxysilane, 4-amino-3,3-dimethylbutyltrimethoxysilane or 4-amino-3,3-dimethylbutyltriethoxysilane.

Suitable lactones are in particular γ-valerolactone, γ-octalactone, δ-decalactone, and ε-decalactone, in particular γ-valerolactone.

Suitable cyclic carbonates are in particular 4,5-dimethyl-1,3-dioxolan-2-one, 4,4-dimethyl-1,3-dioxolan-2-one, 4-ethyl-1,3-dioxolan-2-one, 4-methyl-1,3-dioxolan-2-one or 4-(phenoxymethyl)-1,3-dioxolan-2-one.

Suitable lactides are in particular 1,4-dioxane-2,5-dione (lactide formed from 2-hydroxyacetic acid, also called "glycolide"), 3,6-dimethyl-1,4-dioxane-2,5-dione (lactide formed from lactic acid, also called "lactide"), and 3,6-diphenyl-1,4-dioxane-2,5-dione (lactide formed from mandelic acid).

Preferred hydroxysilanes that are obtained in this way are N-(3-triethoxysilylpropyl)-2-hydroxypropanamide, N-(3-trimethoxysilylpropyl)-2-hydroxypropanamide, N-(3-triethoxysilylpropyl)-4-hydroxypentanamide, N-(3-triethoxysilylpropyl)-4-hydroxyoctanamide, N-(3-triethoxysilylpropyl)-5-hydroxydecanamide and N-(3-triethoxysilylpropyl)-2-hydroxypropyl carbamate.

Suitable hydroxysilanes are additionally also obtainable from the addition of aminosilanes to epoxides or from the addition of amines to epoxysilanes.

Preferred hydroxysilanes that are obtained in this way are 2-morpholino-4(5)-(2-trimethoxysilylethyl)cyclohexan-1-ol, 2-morpholino-4(5)-(2-triethoxysilylethyl)cyclohexan-1-ol or 1-morpholino-3-(3-(triethoxysilyl)propoxy)propan-2-ol.

Also suitable as polyethers or polyurethanes containing silane groups are commercially available products, in particular the following: MS Polymer™ (from Kaneka Corp.; in particular the S203H, S303H, S227, S810, MA903 and S943 products); MS Polymer™ or Silyl™ (from Kaneka Corp.; in particular the SAT010, SAT030, SAT200, SAX350, SAX400, SAX725, MAX450, MAX951 products); Excestar® (from Asahi Glass Co. Ltd.; in particular the S2410, S2420, S3430, S3630 products); SPUR+* (from Momentive Performance Materials; in particular the 1010LM, 1015LM, 1050MM products); Vorasil™ (from Dow Chemical Co.; in particular the 602 and 604 products); Desmoseal® (from Bayer MaterialScience AG; in particular the S XP 2458, S XP 2636, S XP 2749, S XP 2774 and S XP 2821 products), TEGOPAC® (from Evonik Industries AG; in particular the Seal 100, Bond 150, Bond 250 products), Polymer ST (from Hanse Chemie AG/Evonik Industries AG, in particular the 47, 48, 61, 61 LV, 77, 80, 81 products); Geniosil® STP (from Wacker Chemie AG; in particular the E10, E15, E30, E35 products).

Particularly preferred organic polymers containing silane groups have end groups of the formula (II)

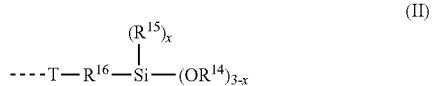

(II)

where $R^{16}$ is a linear or branched divalent hydrocarbyl radical having 1 to 12 carbon atoms that optionally has cyclic and/or aromatic moieties and optionally one or more heteroatoms, especially one or more nitrogen atoms;

T is a divalent radical selected from —O—, —S—, —N($R^{17}$)—, —O—CO—N($R^{17}$)—, —N($R^{17}$)—CO—O— and —N($R^{17}$)—CO—N($R^{17}$)—, where $R^{17}$ is a hydrogen radical or a linear or branched hydrocarbyl radical having 1 to 20 carbon atoms that optionally has cyclic moieties and that optionally has an alkoxysilane, ether or carboxylic ester group; and $R^{14}$, $R^{15}$ and x are as defined above.

$R^{16}$ is preferably 1,3-propylene or 1,4-butylene, wherein butylene may be substituted by one or two methyl groups.

$R^{16}$ is particularly preferably 1,3-propylene.

In a preferred embodiment of the moisture-curing composition according to the present invention, the moisture-reactive polymer P comprises at least one polyurethane polymer PU, wherein the polyurethane polymer PU has free or latent isocyanate groups and the composition in addition optionally comprises a latent curing agent for isocyanate groups.

In a further preferred embodiment of the moisture-curing composition according to the present invention, the moisture-reactive polymer P comprises at least one silane-functional polymer STP.

In the composition according to the invention the silane-functional polymer STP is preferably present in an amount of 10% by weight to 60% by weight, in particular in an amount of 15% by weight to 50% by weight, based on the total composition.

The composition according to the invention further comprises between 3% and 25% by weight, preferably between 4% and 20% by weight, based on the total composition, of at least one type of hollow microsphere H.

The hollow microspheres H used have a compressive strength, measured in accordance with ASTM D3102-72, of at least 2.5 MPa, preferably at least 5 MPa. The compressive strength can be determined in accordance with ASTM D3102-72. A detailed method for the measurement of the preferred hollow microspheres H based on this industry standard can be found in WO 2012/033810, p. 15, second paragraph.

When hollow microspheres H having a compressive strength of below 2.5 MPa are used, not only does this adversely affect the pumpability and the stability of the density after pumping, but it also surprisingly results in a material having low tensile strength and poorer application properties. It is thus essential to the invention that hollow microspheres H having a compressive strength of at least 2.5 MPa are used.

To meet the requirements of the invention, the hollow microspheres H must additionally have a volume-based particle size D90, measured with a Coulter counter, of less than 100 μm. It is also possible to measure the particle size using other methods such as sieve analysis or dynamic light scattering, but it must be ensured (for example through comparative measurements) that any method-related measurement errors are taken into account when comparing different methods. The Coulter counter has proven an accurate and reproducible method for the measurement of hollow microspheres H, in particular those made of glass.

This type of measurement, including a suitable measurement instrument, is described in U.S. Pat. No. 8,261,577 (column 8, rows 7-12).

The accuracy of particle measurement using the Coulter counter of particles of this size, compared with other measurement methods, is described for example in the Journal of Geophysical Research, vol. 115, C08024, 2010, pp. 1-19.

The particle size D90 describes the value below which 90% of the particles in a sample fall. In other words, 90% of particles of the hollow microspheres H have a particle size of below 100 μm.

The hollow microspheres H preferably have a volume-based median particle size D50 of 15 to 65 μm and a volume-based particle size D10 of 5 to 30 μm.

The median particle size D50 describes the value at which half the particles of a sample have a size above this value and half the particles have a size below this value. The particle size D10 describes the value at which 10% of particles of a sample still have a size below this value.

The hollow microspheres H preferably comprise not more than 5%, preferably not more than 1%, of particles having a particle size of over 110 μm. In particular, the hollow microspheres H preferably have no measurable content of particles having a particle size of over 110 μm.

The hollow microspheres H are essentially spherical bodies comprising a shell and a gas in the inner cavity. The gas can for example be air, $CO_2$, nitrogen, oxygen, hydrogen, a noble gas or mixtures of said gases. The shell can be made for example from glass, in particular borosilicate glass, silicates, in particular aluminosilicate, or from polymers, in particular thermoplastic polymers.

The hollow microspheres H are preferably made of glass, in particular borosilicate glass. Suitable hollow microspheres H made of glass and the production thereof are taught for example in U.S. Pat. No. 8,261,577 and WO 2012/033810.

Preferred suitable, commercially available hollow microspheres H made of glass are 3M™ Glass Bubbles, available from 3M Deutschland GmbH. Particular preference is given to the K20, K25, K32, K37 and S28HS products.

In a preferred embodiment of the moisture-curing composition according to the present invention, the hollow microspheres H are hollow glass spheres, in particular borosilicate glass spheres, having a diameter of not more than 110 μm.

The composition according to the invention further comprises at least one inorganic filler F in a proportion of at least 9% by weight, based on the total composition. The composition preferably contains not more than 50% by weight, in particular not more than 40% by weight, of inorganic filler F, based on the total composition.

A content of inorganic filler F of at least 9% by weight in combination with the hollow microspheres H is essential to the mechanical properties and application properties of the cured composition. However, an excessively high filler content of over 50% by weight, makes adjustment to a sufficiently low density of less than 1.20 kg/L difficult.

Examples of suitable inorganic fillers F include chalks, in particular natural, ground or precipitated calcium carbonates, optionally coated with fatty acids, in particular stearic acid, baryte (heavy spar), talcs, quartz powders, quartz sand, dolomites, ground cement, wollastonites, kaolins, calcined kaolins, silicates such as mica (potassium aluminum silicate), molecular sieves, aluminum oxides, aluminum hydroxides, magnesium hydroxide, precipitated or fumed silicas including finely divided silicas from pyrolysis processes, metal powders such as aluminum, copper, iron, silver or steel, and metal oxides such as titanium dioxide.

Preferred fillers F are natural, ground or precipitated calcium carbonates, optionally coated with fatty acids, in particular stearic acid, and also precipitated or fumed silicas including finely divided silicas from pyrolysis processes, and also metal oxides such as titanium dioxide, and also aluminum trihydrate, and mixtures of said fillers.

Aluminum trihydrate (ATH), also referred to as γ-Al $(OH)_3$ and known as the mineral gibbsite (hydrargillite), is a flame-retardant filler known to a person skilled in the art.

All fillers F may also be present in surface-coated, in particular hydrophobized, form. Preference is given to fatty acids as surface coating and to alkylsilane-based coatings in the case of silica fillers. These form a hydrophobic shell around the particles. An example of a particularly preferred fatty acid for coating is stearic acid.

In a preferred embodiment of the moisture-curing composition according to the present invention, the composition contains at least 25% by weight of inorganic filler F, and preferably not more than 40% by weight, based on the total composition. This embodiment has particularly high tensile strength with relatively low density and good expressability and has very good suitability as an adhesive or elastic sealant. This embodiment is additionally adjustable to white or colored forms. A particularly preferred embodiment thereof comprises 25% to 40% by weight of inorganic filler F, based on the total composition, and also 4% to 20% by weight of hollow microspheres H, based on the total composition.

In a further preferred embodiment of the moisture-curing composition according to the present invention, the composition comprises at least 9% by weight of inorganic filler F, and preferably not more than 15% by weight, based on the total composition. This embodiment has particularly low density with good tensile strength good expressability and has very good suitability as a parquet adhesive or joint sealant. This embodiment is additionally adjustable to white or colored forms. A particularly preferred embodiment thereof comprises 9% to 15% by weight of inorganic filler F, based on the total composition, and also 5% to 15% by weight of hollow microspheres H, based on the total composition.

In further preferred embodiments of the moisture-curing composition according to the present invention, the composition additionally also comprises at least one carbon black, preferably between 1% and 25% by weight, in particular between 5% and 20% by weight, of carbon black, based on the total composition.

The use of carbon black has the advantage that particularly good mechanical values, in particular tensile strength, allied with comparatively low extrusion forces can be achieved, which makes the use of these embodiments as structural adhesives in particular possible. A particularly preferred embodiment of such carbon black-containing compositions comprises 9% to 15% by weight of inorganic filler F, based on the total composition, and also 4% to 15% by weight of hollow microspheres H, based on the total composition.

Suitable carbon blacks are all common industrial carbon blacks, in particular dried carbon blacks. Suitable dried carbon blacks include all common industrial carbon blacks, for example Monarch® 570, available from Cabot.

It is additionally possible to use further fillers such as organic fillers, for example PVC powders or graphites. Preference is given to expandable graphites that have an intumescent action. Likewise suitable are all commercially available types, for example Nyagraph® 250, available from Nyacol Nano Technologies, or the expandable graphites from Asbury Carbons.

Preferred embodiments of the present invention achieve fire retardancy class C (s2, d0) as defined in DIN EN 13501-1 after curing.

The composition preferably comprises at least one catalyst for crosslinking the moisture-crosslinkable polymers P, in particular for crosslinking silane groups and/or for crosslinking isocyanate groups with amines or alcohols. Suitable catalysts include in particular metal compounds and/or basic nitrogen or phosphorus compounds.

Suitable metal compounds are in particular compounds of tin, titanium, zirconium, aluminum or zinc, in particular diorganotin(IV) compounds such as in particular dibutyltin (IV) diacetate, dibutyltin(IV) dilaurate, dibutyltin(IV) dineodecanoate or dibutyltin(IV) bis(acetylacetonate), and dioctyltin(IV) dilaurate, and also titanium(IV) or zirconium(IV) or aluminum(III) or zinc(II) complexes having in particular alkoxy, carboxylate, 1,3-diketonate, 1,3-ketoesterate or 1,3-ketoamidate ligands.

Suitable organotitanates are in particular titanium(IV) complexes. Especially suitable are the commercially available products Tyzor® AA, GBA, GBO, AA-75, AA-65, AA-105, DC, BEAT, BTP, TE, TnBT, KTM, TOT, TPT or IBAY (all from Dorf Ketal); Tytan PBT, TET, X85, TAA, ET, S2, S4 or S6 (all from Borica Company Ltd.) and Ken-React® KR® TTS, 7, 9QS, 12, 26S, 33DS, 38S, 39DS, 44, 134S, 138S, 133DS, 158FS or LICA® 44 (all from Kenrich Petrochemicals).

Suitable basic nitrogen or phosphorus compounds are in particular imidazoles, pyridines, phosphazene bases or preferably amines, hexahydrotriazines, biguanides, guanidines or amidines.

Suitable amines are in particular alkyl, cycloalkyl or aralkylamines; amide-containing polyamines, so-called polyamidoamines, such as those commercially available for example under the trade names Versamid® (from Cognis), Aradur® (from Huntsman), Euretek® (from Huntsman) or Beckopox® (from Cytec); or aminosilanes such as in particular 3-aminopropyltrimethoxysilane, 3-aminopropyldimethoxymethylsilane, N-(2-aminoethyl)-3-aminopropyltrimethoxysilane, N-(2-aminoethyl)-3-aminopropylmethyldimethoxysilane, N-(2-aminoethyl)-N'-[3-(trimethoxysilyl)propyl]ethylenediamine or their analogs having ethoxy groups instead of methoxy groups on the silicon.

Suitable hexahydrotriazines are in particular 1,3,5-hexahydrotriazine or 1,3,5-tris(3-(dimethylamino)propyl)hexahydrotriazine.

Suitable biguanides are in particular biguanide, 1-butylbiguanide, 1,1-dimethylbiguanide, 1-butylbiguanide, 1-phenylbiguanide or 1-(o-tolyl)biguanide (OTBG).

Suitable guanidines are in particular 1-butylguanidine, 1,1-dimethylguanidine, 1,3-dimethylguanidine, 1,1,3,3-tetramethylguanidine (TMG), 2-(3-(trimethoxysilyl)propyl)-1,1,3,3-tetramethylguanidine, 2-(3-(methyldimethoxysilyl)propyl)-1,1,3,3-tetramethylguanidine, 2-(3-(triethoxysilyl)propyl)-1,1,3,3-tetramethylguanidine, 1,5,7-triazabicyclo[4.4.0]dec-5-ene (TBD), 7-methyl-1,5,7-triazabicyclo[4.4.0]dec-5-ene, 7-cyclohexyl-1,5,7-triazabicyclo[4.4.0]dec-5-ene, 1-phenylguanidine, 1-(o-tolyl)guanidine (OTG), 1,3-diphenylguanidine, 1,3-di(o-tolyl)guanidine or 2-guanidinobenzimidazole.

Suitable amidines are in particular 1,8-diazabicyclo[5.4.0]undec-7-ene (DBU), 1,5-diazabicyclo[4.3.0]non-5-ene (DBN), 6-dibutylamino-1,8-diazabicyclo[5.4.0]undec-7-ene, 6-dibutylamino-1,8-diazabicyclo[5.4.0]undec-7-ene, N,N'-di-n-hexylacetamidine (DHA), 2-methyl-1,4,5,6-tetrahydropyrimidine, 1,2-dimethyl-1,4,5,6-tetrahydropyrimidine, 2,5,5-trimethyl-1,4,5,6-tetrahydropyrimidine, N-(3-trimethoxysilylpropyl)-4,5-dihydroimidazole or N-(3-triethoxysilylpropyl)-4,5-dihydroimidazole.

In addition, the composition may comprise, as cocatalyst, an acid, in particular a carboxylic acid. Preference is given to aliphatic carboxylic acids such as formic acid, lauric acid, stearic acid, isostearic acid, oleic acid, 2-ethyl-2,5-dimethylcaproic acid, 2-ethylhexanoic acid, neodecanoic acid, aromatic carboxylic acids such as salicylic acid, fatty acid mixtures from the saponification of natural fats and oils or di- and polycarboxylic acids, in particular poly(meth)acrylic acids.

The composition may comprise further constituents, in particular the following auxiliaries and admixtures:

adhesion promoters and/or crosslinkers, in particular aminosilanes such as in particular 3-aminopropyltrimethoxysilane, 3-aminopropyldimethoxymethylsilane, N-(2-aminoethyl)-3-aminopropyltrimethoxysilane, N-(2-aminoethyl)-3-aminopropyldimethoxymethylsilane, N-(2-aminoethyl)-N'-[3-(trimethoxysilyl)-propyl] ethylenediamine or the analogs thereof with ethoxy in place of methoxy groups, and also N-phenyl-, N-cyclohexyl- or N-alkylaminosilanes, mercaptosilanes, epoxysilanes, (meth)acrylosilanes, anhydridosilanes, carbamatosilanes, alkylsilanes or iminosilanes, oligomeric forms of these silanes, adducts formed from primary aminosilanes with epoxysilanes or (meth)acrylosilanes or anhydridosilanes, amino-functional alkylsilsesquioxanes, in particular amino-functional methylsilsesquioxane or amino-functional propylsilsesquioxane. Especially suitable are 3-aminopropyltrimethoxysilane, 3-aminopropyltriethoxysilane, N-(2-aminoethyl)-3-aminopropyltrimethoxysilane, N-(2-aminoethyl)-3-aminopropyltriethoxysilane, 3-glycidoxypropyltrimethoxysilane, 3-glycidoxypropyltriethoxysilane or 3-ureidopropyltrimethoxysilane, or oligomeric forms of these silanes;

desiccants, in particular tetraethoxysilane, vinyltrimethoxysilane, vinyltriethoxysilane or organoalkoxysilanes having a functional group in the a position to the silane group, in particular N-(methyldimethoxysilylmethyl)-O-methylcarbamate, (methacryloxymethyl)silanes, methoxymethylsilanes, orthoformic esters, calcium oxide or molecular sieves, in particular vinyltrimethoxysilane or vinyltriethoxysilane;

plasticizers, in particular carboxylic esters such as phthalates, in particular dioctyl phthalate, bis(2-ethylhexyl) phthalate, bis(3-propylheptyl) phthalate, diisononyl phthalate or diisodecyl phthalate, diesters of orthocyclohexanedicarboxylic acid, in particular diisononyl cyclohexane-1,2-dicarboxylate, adipates, in particular dioctyl adipate, bis(2-ethylhexyl) adipate, azelates, in particular bis(2-ethylhexyl) azelate, sebacates, in particular bis(2-ethylhexyl) sebacate or diisononyl sebacate, polyols, in particular polyoxyalkylene polyols or polyester polyols, glycol ethers, glycol esters, organic phosphoric or sulfonic acid esters, sulfonamides, polybutenes or fatty acid methyl or ethyl esters derived from natural fats or oils and also known as "biodiesel";

solvents;

organic fillers, in particular graphite, cellulose, polymer powders, in particular PVC powders;

fibers, in particular glass fibers, carbon fibers, metal fibers, ceramic fibers or polymer fibers such as polyamide fibers or polyethylene fibers;

dyes and pigments;

rheology modifiers, in particular thickeners, in particular phyllosilicates such as bentonites, derivatives of castor oil, hydrogenated castor oil, polyamides, polyurethanes, urea compounds, fumed silicas, cellulose ethers or hydrophobically modified polyoxyethylenes;

stabilizers against oxidation, heat, light or UV radiation;

natural resins, fats or oils, such as rosin, shellac, linseed oil, castor oil or soybean oil;

non-reactive polymers such as in particular homo- or copolymers of unsaturated monomers, in particular from the group comprising ethylene, propylene, butylene, isobutylene, isoprene, vinyl acetate or alkyl (meth)acrylates, in particular polyethylenes (PE), polypropylenes (PP), polyisobutylenes, ethylene-vinyl acetate copolymers (EVA) or atactic poly-α-olefins (APAO);

surface-active substances, in particular wetting agents, leveling agents, deaerating agents or defoamers;

biocides, in particular algicides, fungicides or substances that inhibit fungal growth;

and other substances customarily used in curable compositions. It may be advisable to subject certain constituents to chemical or physical drying before mixing them into the composition.

In a preferred embodiment, the composition comprises at least one additive, wherein the additive is selected from the list consisting of plasticizers, curing catalysts, stabilizers, thixotropic agents, adhesion promoters, and desiccants. In a particularly preferred embodiment, the composition comprises at least one desiccant and at least one adhesion promoter.

The composition is preferably produced and stored with exclusion of moisture. With exclusion of moisture, it is typically storage-stable in a suitable packaging or assembly, such as in particular a bottle, a canister, a pouch, a bucket, a drum or a cartridge.

The composition may be in the form of a one-component composition or in the form of a multi-component, in particular two-component, composition.

In the present document, "one-component" refers to a composition in which all constituents of the composition are stored mixed together in the same container and which is curable with moisture.

In the present document, "two-component" refers to a composition in which the constituents of the composition are present in two different components that are stored in separate containers. The two components are not mixed with one another until shortly before or during application of the composition, whereupon the mixed composition cures, optionally under the action of moisture.

Any second or optionally further components is/are mixed with the first component before or during application, in particular by means of a static mixer or by means of a dynamic mixer.

The composition is in particular applied in a warm environment, preferably within a temperature range between 0° C. and 45° C., in particular 5° C. to 35° C., and also cures under these conditions.

In the case of application when silane-functional polymers STP are being used, the crosslinking reaction of the silane groups optionally commences under the influence of moisture. Silane groups present can condense with silanol groups present to form siloxane groups (Si—O—Si groups). Silane groups present can on contact with moisture also undergo hydrolysis to silanol groups (Si—OH groups), forming siloxane groups (Si—O—Si groups) through subsequent condensation reactions. As a result of these reactions, the composition ultimately cures.

If water is required for curing, this can either come from the air (atmospheric humidity), or else the composition can be contacted with a water-containing component, for example by painting, for example with a smoothing agent, or by spraying, or water or a water-containing component can be added to the composition during application, for example in the form of a water-containing or water-releasing liquid or paste. A paste is suitable particularly when the composition itself is in the form of a paste.

In the case of curing by means of atmospheric humidity, the composition cures from the outside inward, at first forming a skin on the surface of the composition. The so-called skin time is a measure of the curing rate of the composition. The speed of curing is generally determined by various factors, for example the availability of water, the temperature, etc.

The composition is suitable for a large number of uses, in particular as a resin for the production of fiber composite, as a rigid foam, flexible foam, molding, elastomer, fiber, film or membrane, as a potting compound, sealant, adhesive, covering, coating or paint for construction and industrial applications, for example as a seam seal, cavity seal, electrical insulation compound, spackling compound, joint sealant, weld or crimp seam sealant, assembly adhesive, bodywork adhesive, pane adhesive, sandwich element adhesive, laminating adhesive, laminate adhesive, packaging adhesive, wood adhesive, parquet adhesive, anchoring adhesive, floor covering, floor coating, balcony coating, roof coating, concrete protection coating, parking garage coating, seal, pipe coating, anticorrosion coating, textile coating, damping element, sealing element or spackling compound. The composition is particularly suitable as an adhesive and/or sealant, in particular for joint sealing and for elastic adhesive bonding in construction and industrial applications, and as an elastic coating with crack-bridging properties, in particular for the protection and/or sealing of roofs, floors, balconies, parking decks or concrete pipes, for example, and also as an adhesive and/or sealant in the production, repair and fitting out of means of transport such as rail transport vehicles, road transport vehicles, aircraft and ships.

The composition is thus preferably an adhesive or a sealant or a coating.

A composition of this kind typically comprises plasticizers, fillers, adhesion promoters and/or crosslinkers and desiccants and optionally further auxiliaries and additives.

The composition according to the invention has a density of less than 1.20 kg/L, preferably less than 1.10 kg/L. In particularly preferred embodiments, the composition according to the invention has a density of less than 1.00 kg/L, in particular less than 0.90 kg/L.

The density can be determined using a density meter, preferably a pycnometer, or via water displacement (volume measurement by the Archimedes principle).

A person skilled in the art can easily adjust the desired density of the composition by varying the amounts and nature of the constituents of the composition according to the invention as claimed in claim 1 through routine tests.

For use as an adhesive or sealant, the composition preferably has a pasty consistency with structurally viscous properties. A pasty sealant or adhesive of this kind is applied to a substrate in particular from standard cartridges that are operated manually, by means of compressed air or a battery, or from a drum or hobbock by means of a delivery pump or an extruder, optionally by means of an application robot.

For use as a coating, the composition preferably has a liquid consistency at room temperature with self-leveling properties. It may be slightly thixotropic, such that the coating is applicable to sloping to vertical surfaces without flowing away immediately. It is especially applied by means of a roller or brush or by pouring-out and distribution by means, for example, of a roller, a scraper or a notched trowel.

During application the composition is preferably applied to at least one substrate. Suitable substrates are in particular
glass, glass ceramic, concrete, mortar, brick, tile, plaster and natural rocks such as limestone, granite or marble;

metals and alloys such as aluminum, iron, steel or non-ferrous metals, and also surface-finished metals or alloys such as galvanized or chromed metals;

leather, textiles, paper, wood, wood-based materials bonded with resins, for example phenolic, melamine or epoxy resins, resin-textile composites and other so-called polymer composites;

plastics such as polyvinyl chloride (rigid and flexible PVC), acrylonitrile-butadiene-styrene copolymers (ABS), polycarbonate (PC), polyamide (PA), polyesters, poly(methyl methacrylate) (PMMA), epoxy resins, polyurethanes (PUR), polyoxymethylene (POM), polyolefins (PO), polyethylene (PE) or polypropylene (PP), ethylene-propylene copolymers (EPM) or ethylene-propylene-diene terpolymers (EPDM), or fiber-reinforced plastics such as carbon fiber-reinforced plastics (CFP), glass fiber-reinforced plastics (GFP) and sheet molding compounds (SMC), where the plastics may preferably have been surface-treated by means of plasma, corona or flames;

coated substrates such as powder-coated metals or alloys;

paints or varnishes, especially automotive topcoats.

The substrates can if required be pretreated prior to the application of the composition, in particular by physical and/or chemical cleaning methods or by the application of an adhesion promoter, an adhesion promoter solution or a primer.

It is possible to bond or seal two identical or two different substrates, especially the abovementioned substrates.

After the curing of the composition with water, in particular water in the form of atmospheric humidity, a cured composition is obtained.

The use of the composition affords an article that has in particular been bonded, sealed or coated with the composition. The article is in particular a built structure, in particular an above-ground or below-ground built structure, an industrially manufactured good or a consumer good, in particular a window, a domestic appliance or a means of transport such as in particular an automobile, a bus, a truck, a rail vehicle, a ship, an aircraft or a helicopter; or the article may be an installable component thereof.

A further aspect of the invention is the use of a moisture-curing composition as described above as an adhesive, sealant or coating for sound insulation and/or heat insulation.

A further aspect of the invention is the use of a moisture-curing composition as described above as an adhesive, sealant or coating having fire retardant properties, said composition achieving fire retardancy class C (s2, d0) as defined in DIN EN 13501-1 after curing.

A further aspect of the invention is the use of a moisture-curing composition as described above as an adhesive, sealant or coating for weight reduction.

A further aspect of the invention is a built structure or article of manufacture that has been bonded, sealed or coated with an adhesive, sealant or a coating as described above.

A further aspect of the invention is a cured composition as described above.

EXAMPLES

Working examples are presented hereinbelow, which are intended to further elucidate the invention described. The invention is of course not limited to these described working examples.

"Standard climatic conditions" refer to a temperature of 23±1° C. and a relative atmospheric humidity of 50±5%.

The tensile strength and the elongation at break were determined in accordance with DIN 53504 (tensile speed 200 mm/min) on films with a film thickness of 2 mm cured for 7 days at 23° C. and 50% relative atmospheric humidity.

For determination of the extrusion force, internally-coated aluminum cartridges (outer diameter 46.9 mm, inner diameter 46.2 mm, length 215 mm, opening 15-M) were filled with the compositions and sealed airtight with polyethylene stoppers (diameter 46.1 mm) from Novelis Deutschland GmbH. After conditioning at 23° C. for 24 hours, the cartridges were opened and the contents expressed by means of an expression device. For this, a nozzle having an orifice with an inner diameter of 3 mm was screwed onto the thread of the cartridge. An expression device (Zwick/Roell Z005) was used to determine the force needed to express the composition at an expression rate of 60 mm/min. The reported value is the average of the forces measured after an expression distance of 22 mm, 24 mm, 26 mm, and 28 mm. After an expression distance of 30 mm, the measurement was stopped.

The density of a sample was measured on a pycnometer with a volume of 100 mL that was thermally equilibrated at 23° C.

The theoretical density of a formulation was calculated on the basis of the proportions and density data of the raw materials.

For determination of the resistance to pumping, the density of a test formulation was first measured freshly after production and then a second time after an identical sample had been pumped through a drum pump with a pressure of bar (pressure peak at the metering stroke). A difference of 5% or less in the two density measurements indicates satisfactory resistance to pumping.

The thread formation in mm refers to the length of the sealant thread that remains after application of the sealant from an application gun after lifting the nozzle from the applied sealant bead. A relatively short thread is preferable.

Production of the Polymer P and of Thixotropic Agent 1

Production of the Silane-Functional Polymer STP-1

1000 g of Acclaim® 12200 polyol (from Covestro; low monol polyoxypropylenediol, OH value 11.0 mg KOH/g, water content approx. 0.02% by weight), 43.6 g of isophorone diisocyanate (Vestanat® IPDI from Evonik Industries), 126.4 g of triethylene glycol bis(2-ethylhexanoate) (Solusolv® 2075 from Eastman Chem.), and 0.12 g of dibutyltin dilaurate were heated to 90° C. with exclusion of moisture and continuous stirring and maintained at this temperature until the content of free isocyanate groups as determined titrimetrically had reached a value of 0.63% by weight. 62.3 g of diethyl N-(3-trimethoxysilylpropyl)aminosuccinate (adduct of 3-aminopropyltrimethoxysilane and diethyl maleate; produced as described in U.S. Pat. No. 5,364,955) was then mixed in and the mixture was stirred at 90° C. until free isocyanate was no longer detectable by FT-IR spectroscopy. The silane-functional polymer was cooled to room temperature and stored with exclusion of moisture.

Production of Thixotropic Agent 1

A vacuum mixer was charged with 1000 g of hydrogenated diisononyl phthalate (Hexamol® DINCH, BASF) and 160 g of diphenylmethane 4,4'-diisocyanate (Desmodur® 44 MC L, Bayer MaterialScience AG, Deutschland) and the contents were heated gently. 90 g of monobutylamine was then slowly added dropwise with vigorous stirring. The resulting white paste was stirred for a further hour under reduced pressure while cooling. Thixotropic agent 1 contains 20 parts by weight of this reaction product and 80 parts by weight of diisodecyl phthalate.

Production of the Moisture-Curing Compositions

Comparative examples are labeled "(ref.)" in Tables 2 to 5. The raw materials used are described in Table 1.

Raw Materials Used

TABLE 1

Raw materials used in the example formulations

| Raw material | Manufacturer/Description |
|---|---|
| Polymer STP-1 | Silane-functional polymer; production see above. |
| Plasticizer 1 | Diisodecyl phthalate (Jayflex ® DIDP; Exxon Mobil) |
| Plasticizer 2 | Diisononyi cyclohexane-1,2-dicarboxylate (Hexamoll ® DINCH; BASF) |
| Inorganic filler F1 | Titanium dioxide (Kronos ® 2500; Kronos) |
| Inorganic filler F2 | Fumed silica (Cab-O-Sil ® M5; Cabot) |
| Inorganic filler F3 | Ground calcium carbonate (Omyacarb ® 5-GU; Omya) |
| Carbon black | Carbon black (Monarch ® 570; Cabot) (dried) |
| Hollow microspheres H1 | Hollow spheres made of borosilicate glass, density: 0.15 kg/L, isostatic compressive strength: 2.1 MPa, particle size D90: 105 μm, largest diameter: 115 μm (3M ® Glass Bubbles K15; 3M) |
| Hollow microspheres H2 | Hollow spheres made of borosilicate glass, density: 0.25 kg/L, isostatic compressive strength: 5.2 MPa, particle size D90: 95 μm, largest diameter: 105 μm (3M ® Glass Bubbles K25; 3M) |
| Hollow microspheres H3 | Hollow spheres made of borosilicate glass, density: 0.32 kg/L, isostatic compressive strength: 13.8 MPa, particle size D90: 80 μm, largest diameter: 85 μm (3M ® Glass Bubbles K32; 3M) |
| Hollow microspheres H4 | Hollow spheres made of borosilicate glass, density: 0.28 kg/L, isostatic compressive strength: 21.0 MPa, particle size D90: 55 μm, largest diameter: 65 μm (3M ® Glass Bubbles S28HS; 3M) |
| Hollow microspheres H5 | Hollow spheres made of aluminosilicate, density 0.6-0.7 kg/L, particle size 50-180 μm (Aeropor ® 180, SH Minerals) |
| Hollow microspheres H6 | Hollow spheres made of aluminosilicate, density 0.7 kg/L, particle size 50-300 μm (Cenospheres ®, SH Minerals) |
| Hollow microspheres H7 | Expanded hollow spheres made of thermoplastic polymer, density 0.025 kg/L, compressive strength 1.2 MPa, particle size 35-55 μm (Expancel ® 461 DET d25, AkzoNobel) |
| Thixotropic agent 1 | Urea derivative; production see above |
| Thixotropic agent 2 | Castor oil derivative (Thixatrol ® ST; Elementis) |
| Catalyst 1 | Dibutyltin dilaurate (Sigma Aldrich) |
| Desiccant | Vinyltrimethoxysilane (Silquest ® A-171; Momentive) |
| Adhesion promoter | N-(2-Aminoethyl)-3-aminopropyltrimethoxysilane (Silquest ® A-1110; Momentive) |
| Stabilizer | HALS light stabilizer (Tinuvin ® 770 DF; BASF) |

TABLE 2

Compositions Z-1 to Z-4 in % by weight, in each case based on the total composition.

| Composition | Z-1 (ref.) | Z-2 | Z-3 | Z-4 |
|---|---|---|---|---|
| Polymer STP-1 | 40.0 | 40.0 | 40.0 | 40.0 |
| Stabilizer | 0.3 | 0.3 | 0.3 | 0.3 |
| Plasticizer 1 | 9.18 | 9.18 | 9.18 | 9.18 |
| Desiccant | 2.0 | 2.0 | 2.0 | 2.0 |
| Inorganic filler F1 | 2.0 | 2.0 | 2.0 | 2.0 |
| Thixotropic agent 1 | 25.0 | 25.0 | 25.0 | 25.0 |
| Inorganic filler F2 | 2.0 | 2.0 | 2.0 | 2.0 |
| Inorganic filler F3 | 6.5 | 6.5 | 6.5 | 6.5 |
| Hollow microspheres H1 | 11.0 | — | — | — |
| Hollow microspheres H2 | — | 11.0 | — | — |
| Hollow microspheres H3 | — | — | 11.0 | — |
| Hollow microspheres H4 | — | — | — | 11.0 |
| Adhesion promoter | 2.0 | 2.0 | 2.0 | 2.0 |
| Catalyst | 0.02 | 0.02 | 0.02 | 0.02 |
| TOTAL | 100 | 100 | 100 | 100 |
| Test results | | | | |
| Extrusion force (3 mm) [N] | 683 | 580 | 569 | 552 |
| Thread formation [mm] | 40 | 40 | 40 | 43 |
| Tensile strength [MPa] | 1.3 | 1.5 | 1.6 | 1.7 |
| Elongation at break [%] | 220 | 211 | 215 | 207 |
| Density before pumping [kg/L] | 0.64 | 0.79 | 0.85 | 0.84 |
| Density after pumping [kg/L] | 1.01 | 0.82 | 0.87 | 0.84 |
| Resistance to pumping | No | Yes | Yes | Yes |

TABLE 3

Compositions Z-5 to Z-8 and Z-18 in % by weight, in each case based on the total composition.

| Composition | Z-5 | Z-6 | Z-7 | Z-8 | Z-18 (ref.) |
|---|---|---|---|---|---|
| Polymer STP-1 | 40.0 | 40.0 | 40.0 | 50.0 | 40.0 |
| Stabilizer | 0.3 | 0.3 | 0.3 | 0.3 | 0.3 |
| Plasticizer 1 | 9.27 | 9.27 | 9.27 | 15.95 | 17.7 |
| Desiccant | 2.0 | 2.0 | 2.0 | 0.5 | 2.0 |
| Inorganic filler F1 | 2.0 | 2.0 | 2.0 | — | 2.0 |
| Thixotropic agent 1 | 25.0 | 25.0 | 25.0 | — | 25.0 |
| Inorganic filler F2 | 2.0 | 2.0 | 2.0 | — | 2.0 |
| Inorganic filler F3 | 8.4 | 9.4 | 10.4 | 9.1 | — |
| Carbon black | — | — | — | 18.5 | — |
| Hollow microspheres H4 | 9.0 | 8.0 | 7.0 | 4.0 | 9.0 |
| Adhesion promoter | 2.0 | 2.0 | 2.0 | 1.5 | 2.0 |
| Catalyst 1 | 0.03 | 0.03 | 0.03 | 0.15 | 0.02 |
| TOTAL | 100 | 100 | 100 | 100 | 100 |
| Test results | | | | | |
| Extrusion force (3 mm) [N] | 507 | 481 | 462 | n/m | 352 |
| Thread formation [mm] | 37 | 32 | 40 | 39 | 51 |
| Tensile strength [MPa] | 1.7 | 1.7 | 1.7 | 5.5 | 1.1 |
| Elongation at break [%] | 218 | 225 | 236 | 230 | 216 |
| Density before pumping [kg/L] | 0.88 | 0.91 | 0.93 | 1.06 | 0.82 |
| Density after pumping [kg/L] | 0.88 | 0.90 | 0.93 | 1.05 | 0.82 |
| Resistance to pumping | Yes | Yes | Yes | Yes | Yes |

"n/m" means that the value was not measured.

TABLE 4

Compositions Z-9 to Z-12 in % by weight, in each case based on the total composition.

| Composition | Z-9 | Z-10 | Z-11 | Z-12 |
|---|---|---|---|---|
| Polymer STP-1 | 24.0 | 24.0 | 24.0 | 24.0 |
| Stabilizer | 0.3 | 0.3 | 0.3 | 0.3 |
| Plasticizer 1 | 10.1 | 10.1 | 10.1 | 10.1 |
| Desiccant 1 | 1.5 | 1.5 | 1.5 | 1.5 |
| Inorganic filler F1 | 2.0 | 2.0 | 2.0 | 2.0 |
| Thixotropic agent 1 | 20.0 | 20.0 | 20.0 | 20.0 |
| Inorganic filler F3 | 37.0 | 33.0 | 29.0 | 25.0 |

TABLE 4-continued

Compositions Z-9 to Z-12 in % by weight, in each case based on the total composition.

| Composition | Z-9 | Z-10 | Z-11 | Z-12 |
|---|---|---|---|---|
| Hollow microspheres H4 | 4.0 | 8.0 | 12.0 | 16.0 |
| Adhesion promoter | 1.0 | 1.0 | 1.0 | 1.0 |
| Catalyst 1 | 0.1 | 0.1 | 0.1 | 0.1 |
| TOTAL | 100 | 100 | 100 | 100 |
| Test results | | | | |
| Extrusion force (3 mm) [N] | 535 | 587 | n/m | n/m |
| Thread formation [mm] | 30 | 37 | 28 | 33 |
| Tensile strength [MPa] | 2.0 | 2.0 | 2.0 | 2.1 |
| Elongation at break [%] | 255 | 196 | 158 | 139 |
| Density before pumping [kg/L] | 1.17 | 1.01 | 0.90 | 0.81 |
| Density after pumping [kg/L] | 1.19 | 1.00 | 0.90 | 0.81 |
| Resistance to pumping | Yes | Yes | Yes | Yes |

"n/m" means that the value was not measured.

TABLE 5

Compositions Z-13 to Z-17 in % by weight, in each case based on the total composition.

| Composition | Z-13 (ref.) | Z-14 (ref.) | Z-15 | Z-16 | Z-17 (ref.) |
|---|---|---|---|---|---|
| Polymer STP-1 | 17.5 | 17.5 | 21.0 | 21.0 | 17.5 |
| Plasticizer 2 | 31.21 | 31.21 | 31.5 | 31.5 | 31.56 |
| Desiccant | 1.5 | 1.5 | 1.5 | 1.5 | 1.5 |
| Thixotropic agent 2 | 1.75 | 1.75 | 1.75 | 1.75 | 1.75 |
| Inorganic filler F3 | 31 | 31 | 35.21 | 34.25 | 38.25 |
| Hollow microsphere H2 | — | — | 8.0 | — | — |
| Hollow microspheres H4 | — | — | — | 8.96 | — |
| Hollow microspheres H5 | 16 | — | — | — | — |
| Hollow microspheres H6 | — | 16 | — | — | — |
| Hollow microspheres H7 | — | — | — | — | 1.0 |
| Adhesion promoter | 1.0 | 1.0 | 1.0 | 1.0 | 1.0 |
| Catalyst 1 | 0.04 | 0.04 | 0.04 | 0.04 | 0.04 |
| TOTAL | 100 | 100 | 100 | 100 | 100 |
| Test results | | | | | |
| Tensile strength [MPa] | 0.86 | 0.83 | 1.31 | 1.57 | 1.07 * |
| Elongation at break [%] | 129 | 117 | 146 | 166 | 175 * |
| Density calculated [kg/L] | 1.13 | 1.13 | 0.97 | 0.97 | 0.88 * |
| Density measured fresh [kg/L] | 1.24 | 1.12 | 0.97 | 0.97 | 1.00 * |
| Density measured after 6 months at RT [kg/L] | 1.24 | 1.12 | 0.97 | 0.97 | 1.02 * |

* a substantial amount of Z-17 continued to run out of the cartridge after expression.

Production of STP Compositions Z-1 to Z-18

The silane-functional polymer STP-1, plasticizer, and desiccant were thoroughly mixed for 5 minutes in a vacuum mixer in the parts by weight indicated in Tables 2 to 5. The respective fillers, hollow microspheres, and thixotropic agents were then kneaded in at 60° C. for 15 minutes. With the heating switched off, adhesion promoter, catalyst, and optionally stabilizer were then added and the mixture was processed into a homogeneous paste under reduced pressure for 10 minutes. The paste was then transferred to internally-coated aluminum applicator gun cartridges and, after storage, used further for the test specimens. The exact quantities (in % by weight based on the total composition in each case) of the individual raw materials for the respective experiments are shown in Tables 2 to 5.

The test results in Tables 2 to 5 show clearly that the compositions according to the invention are superior to the non-inventive examples in respect of high tensile strength, low extrusion force, low thread formation, stability to pumping, while having the same low density.

The invention claimed is:

1. A moisture-curing composition comprising
a) at least one moisture-reactive polymer P in a proportion of 10% to 60% by weight, based on the total composition,
b) at least one inorganic filler F in a proportion of at least 9% by weight, based on the total composition, and
c) between 3% and 25% by weight, based on the total composition, of at least one type of hollow microsphere H,
wherein:
the composition has a density of less than 1.20 kg/L, and
the hollow microspheres H have:
a compressive strength, measured in accordance with ASTM D3102-72, of at least 2.5 MPa, and
a volume-based particle size D90, measured with a Coulter counter, of less than 100 μm.

2. The moisture-curing composition as claimed in claim 1, wherein the hollow microspheres H are hollow glass spheres having a diameter of not more than 110 μm.

3. The moisture-curing composition as claimed in claim 1, wherein the at least one inorganic filler F is selected from the group consisting of precipitated or ground chalk, precipitated or fumed silica, titanium dioxide, or combinations of said fillers.

4. The moisture-curing composition as claimed in claim 1, wherein the moisture-reactive polymer P comprises at least one polyurethane polymer PU, wherein the polyurethane polymer PU has free or latent isocyanate groups and the composition in addition optionally comprises a latent curing agent for isocyanate groups.

5. The moisture-curing composition as claimed in claim 1, wherein the moisture-reactive polymer P comprises at least one silane-functional polymer STP.

6. The moisture-curing composition as claimed in claim 5, wherein the silane-functional polymer STP has end groups of the formula (II)

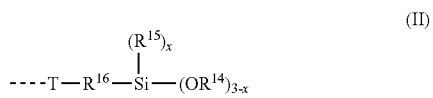

(II)

where
$R^{14}$ is a linear or branched monovalent hydrocarbyl radical having 1 to 5 carbon atoms; $R^{15}$ is a linear or branched monovalent hydrocarbyl radical having 1 to 8 carbon atoms;
x has a value of 0 or 1 or 2;
$R^{16}$ is a linear or branched divalent hydrocarbyl radical having 1 to 12 carbon atoms that optionally has cyclic and/or aromatic moieties and optionally one or more heteroatoms; and
T is a divalent radical selected from —O—, —S—, —N($R^7$)—, —O—CO—N($R^{17}$)—, —N($R^{17}$)—CO—O— and —N($R^{17}$)—CO—N($R^{17}$)—,
where $R^{17}$ is a hydrogen radical or a linear or branched hydrocarbyl radical having 1 to 20 carbon atoms that optionally has cyclic moieties and that optionally has an alkoxysilane, ether or carboxylic ester group.

7. The moisture-curing composition as claimed in claim 1, wherein the composition additionally comprises at least one additive, wherein the additive is selected from the list consisting of plasticizers, curing catalysts, stabilizers, thixotropic agents, adhesion promoters, and desiccants.

8. The moisture-curing composition as claimed in claim 1, wherein the composition contains at least 25% by weight of inorganic filler F, based on the total composition.

9. The moisture-curing composition as claimed in claim 1, wherein the composition additionally contains between 1% and 25% by weight of carbon black, based on the total composition.

10. The moisture-curing composition as claimed in claim 1, wherein the composition comprises 9% to 15% by weight of inorganic filler F, based on the total composition, and also 5% to 15% by weight of hollow microspheres H, based on the total composition.

11. The moisture-curing composition as claimed claim 1, wherein the composition exhibits a fire retardancy class C as defined in DIN EN 13501-1 after curing.

12. A built structure or article of manufacture that has been bonded, sealed or coated with the moisture-curing composition as claimed in claim 1.

13. A cured composition of the moisture curing composition as claimed in claim 1.

14. The moisture-curing composition as claimed claim 1, wherein the composition has a density of less than 1.10 kg/L.

15. The moisture-curing composition as claimed claim 1, wherein the composition contains from 9% to 50% by weight of inorganic filler F, based on the total composition.

16. The moisture-curing composition as claimed claim 1, wherein the composition contains from 9% to 40% by weight of inorganic filler F, based on the total composition.

17. The moisture-curing composition as claimed claim 1, wherein the composition contains from 9% to 14.4% by weight of inorganic filler F, based on the total composition.

\* \* \* \* \*